US012798941B2

(12) United States Patent
Peterson et al.

(10) Patent No.: US 12,798,941 B2
(45) Date of Patent: Nov. 17, 2026

(54) WHEEL ASSEMBLY FOR MATERIAL HANDLING VEHICLE

(71) Applicant: Superior Tire & Rubber Corp., Warren, PA (US)

(72) Inventors: Joseph J. Peterson, Warren, PA (US); Kyle R. Knotowicz, Jamestown, NY (US)

(73) Assignee: SUPERIOR TIRE & RUBBER CORP., Warren, PA (US)

( * ) Notice: Subject to any disclaimer, the term of this patent is extended or adjusted under 35 U.S.C. 154(b) by 518 days.

(21) Appl. No.: 18/338,782

(22) Filed: Jun. 21, 2023

(65) Prior Publication Data

US 2023/0416064 A1 Dec. 28, 2023

Related U.S. Application Data

(60) Provisional application No. 63/354,270, filed on Jun. 22, 2022.

(51) Int. Cl.

| | |
|---|---|
| ***B66F 9/075*** | (2006.01) |
| ***B60B 11/02*** | (2006.01) |
| ***B60B 33/00*** | (2006.01) |

(52) U.S. Cl.

CPC .......... *B66F 9/07559* (2013.01); *B60B 11/02* (2013.01); *B60B 33/0042* (2013.01)

(58) Field of Classification Search

CPC ............................ B60B 11/02; B60B 33/0042

See application file for complete search history.

(56) References Cited

U.S. PATENT DOCUMENTS

| | | | | |
|---|---|---|---|---|
| 270,605 | A * | 1/1883 | Paepke | B60B 33/0042 16/48 |
| 2,618,490 | A | 11/1952 | Frischmann | |
| 2,713,179 | A * | 7/1955 | Clifton | B60B 33/00 280/79.11 |
| 3,814,456 | A | 6/1974 | Bryntse | |
| 3,951,370 | A * | 4/1976 | Tompkins | B60B 33/00 16/18 R |
| 4,295,779 | A * | 10/1981 | Shumaker | E02F 3/3414 414/722 |
| 6,604,258 | B2 * | 8/2003 | Saggio | B60B 33/0068 16/48 |
| 9,981,687 | B2 * | 5/2018 | Smith | B60B 11/02 |
| 10,259,263 | B2 * | 4/2019 | McCartney | F16D 43/215 |
| 10,377,176 | B2 * | 8/2019 | Aubin | B60B 33/0068 |
| 11,161,371 | B2 * | 11/2021 | Aubin | B60B 33/0028 |
| 2006/0232030 | A1 | 10/2006 | Passeri | |

(Continued)

*Primary Examiner* — Jason R Bellinger

(74) *Attorney, Agent, or Firm* — Paul D. Strain, Esq.; Strain & Strain PLLC

(57) ABSTRACT

A wheel assembly for a material handling vehicle outrigger includes two axles mounted in tandem configuration. Each axle supports at least two independently rotating wheels. The first axle has a first wheel and second wheel that rotate independently of each other. The second axle similarly has a first wheel and second wheel that rotate independently. The relative dimensions and spatial relationships of and between the axles, wheels, and pivot points is specified to provide strong performance in comparison to prior approaches, enhanced maneuverability and load distribution for the outrigger system of the material handling vehicle.

13 Claims, 11 Drawing Sheets

(56) References Cited

U.S. PATENT DOCUMENTS

| | | | | |
|---|---|---|---|---|
| 2007/0029865 | A1* | 2/2007 | Chen | B60B 5/02 301/5.1 |
| 2007/0057565 | A1* | 3/2007 | Chen | B60B 11/02 301/13.1 |
| 2007/0107160 | A1* | 5/2007 | Jane Santamaria | B60B 11/02 16/46 |
| 2016/0075542 | A1 | 3/2016 | Buchmann | |
| 2017/0232811 | A1* | 8/2017 | Smith | B60B 35/006 280/124.116 |

* cited by examiner

Class I Powered Industrial Trucks

(A)

(B)

(C)

(D)

Class II Powered Industrial Trucks

(A)

(B)

(C)

(D)

(E)

(F)

(G)

(H)

Class III Powered Industrial Trucks

Class IV Powered Industrial Trucks (A)

Class V Powered Industrial Trucks

(A)

Class VI Powered Industrial Trucks (A)

Class VII Powered Industrial Trucks

(A)

(B)

(C)

WHEEL ASSEMBLY FOR MATERIAL HANDLING VEHICLE

CROSS-REFERENCE TO RELATED PATENT APPLICATIONS

This application is based upon and claims the benefit of priority under 35 U.S.C. § 119(e) to U.S. Provisional Application No. 63/354,270, filed Jun. 22, 2022, the entire contents of which are incorporated herein by reference in their entirety.

FIELD OF THE INVENTION

This invention relates generally to a wheel assembly for a material handling vehicle and in particular, to a multi-axle and multi-wheel assembly adapted for use in material handling vehicles, such as Class II narrow aisle trucks or forklifts.

BACKGROUND OF THE INVENTION

Material handling vehicles are powered industrial trucks designed for use in warehouses and may be required to operate in narrow aisles, for example, aisles that are twelve feet wide or less. The vehicles are typically classified as Class II narrow aisle forklifts or trucks, and include reach trucks, orders pickers, and very narrow aisle forklifts, also referred to as turret trucks. Many such material handling vehicles are provided with base legs or outriggers, which extend outward from the main body of the vehicle, typically on either side of the forks or platform. The outriggers prevent the vehicle from tipping forward when the vehicle is loaded with material.

The ends of the outriggers incorporate a load wheel, which supports the vehicle, whether the vehicle is stationary or transporting material from one location to another. The wheels are designed to operate indoors and are typically solid. Each of the wheels is mounted on an axle, with the axle aligned perpendicular to the usual direction of travel of the vehicle. The axle may be supported by a bracket, and the bracket is supported by the outrigger. Alternatively, the axle may be directly supported by the outrigger.

The nature of the applications for which Class II material handling vehicles are employed requires that they be able to turn with a relatively short radius, i.e., less than 36 inches (whereas other trucks, such as Class I or Class III trucks, have a much larger turning radius and are used in applications which do not require regular small radius turning). More preferably, however, the vehicles should exhibit essentially static turning, i.e., a turning radius of zero inches or less than one inch. Additionally, the wheels and outriggers must be capable of fitting around pallets, under warehouse racking, and between racking supports commonly found in warehouse storage systems to function effectively. Typically, the maximum total height of the wheels must be no greater than 6 inches in North America and 8 inches in Europe so that the wheel and outrigger assemblies can accommodate working with industry-standard storage systems (typical systems in the remainder of the world follow one of these two standards). Thus, while the load-bearing capacity of the wheel may be increased by increasing the size of the wheel, operating restrictions in the warehouse environment limit the diameter and width of the wheel.

To increase the load capacity of the outriggers, two wheels are sometimes provided adjacent to the end of each outrigger. For example, a first wheel is mounted on a first axle, a second wheel is mounted on a second axle, and the first and second axles are mounted on the outrigger front-to-back, referred to herein as being in tandem. Accordingly, when the vehicle is moving forward, the first and second wheels roll in the direction of travel, that is, with the first and second axles aligned perpendicular to the direction of travel.

Operating a material handling vehicle in a warehouse requires that the vehicle be capable of pivoting in limited space. The pivot point of a typical Class II material handling vehicle is near the point of attachment of the outrigger to the body of the vehicle, referred to herein as the proximate end of the outrigger. For example, the vehicle may be equipped with two wheels at the back of the body and a wheel assembly at the distal end of each outrigger. The pivot point of the vehicle, when turning, is approximately midway between the back wheels and the wheel assemblies at the distal ends of the outriggers.

The positions of the load wheels located in the vehicle's outriggers are typically fixed.

For example, the load wheels are mounted on an axle and the axle may be oriented perpendicular to the linear extent of the outrigger. When the vehicle pivots, however, one side of each load wheel will be on the inside of the turn, and one side of each load wheel will be on the outside of the turn. It may be understood that when the vehicle pivots, the inside arc of the load wheel will travel less distance than the outside arc of the load wheel, which creates a scuffing action and extra wear on the tires of the load wheels. The wear may be seen as abrasion, coning and flat spotting on the tire of the load wheel. As the width of the wheel increases, for example, to accommodate heavier loads, the problem of extra wear is exacerbated.

Various attempts to develop an improved wheel assembly are discussed in the following patent references: Frischmann—U.S. Pat. No. 2,618,490; Bryntse—U.S. Pat. No. 3,814,456; and Passeri—US 2006/0232030 A1. However, these arrangements include several drawbacks, including large turning radiuses that are not capable of functioning in modern warehouse settings with narrow aisles, increased wear which negatively impacts wheel life and truck service downtime, and a limited load capacity not capable of meeting projected load demands. Thus, there remains a need for an improved truck incorporating a wheel assembly and outrigger capable of accommodating the requirements of modern warehousing.

In attempting to address increased load requirements, the conventional wisdom in the art has been to provide a single wide wheel per axle to maximize the contact area with the floor. This conventional approach has recently led industry participants to fabricate extra-wide outriggers (e.g., by modifying standard equipment via welding) capable of holding a wider wheel to provide a wheel capable of bearing additional load.

As detailed herein, the inventors of the present application have designed a wheel assembly and outrigger that proceeds against this conventional wisdom and provides enhanced load-bearing capacity and superior life with respect to conventional designs.

SUMMARY OF THE INVENTION

The present invention is directed to a wheel assembly for a material handling vehicle.

The wheel assembly may be mounted in the outrigger of a material handling vehicle. Thus, the present invention is also directed to an outrigger incorporating a wheel assembly, as well as a material handling vehicle incorporating such a wheel assembly. In one embodiment, the wheel assembly is provided with a first axle and at least two wheels mounted on the axle. The first axle may have more than two wheels mounted thereon, for example, three, four, or more wheels. Preferably, the wheels rotate independently of each other. Accordingly, when the vehicle incorporating the wheel assembly pivots, the wheel on the inside of the turning radius is free to travel less distance than the wheel on the outside of the turning radius. Such arrangement provides less contact surface per wheel overall but reduces the degree of coning as to each individual wheel. Such an arrangement also allows for a smaller turning radius—in some embodiments, the turning radius of a truck incorporating a wheel assembly provided herein is essentially zero. The embodiments discussed herein, when undergoing testing, also surprisingly provide a larger load capacity as compared to the traditional single-wheel arrangement.

The wheel assembly is also provided with a second axle and at least two wheels mounted on the second axle (three, four, or more wheels may also be provided). Preferably, the wheels of the second axle rotate independently of each other. The second axle and wheels may be identical to the arrangement of the first axle and wheels, or the second axle and wheels may be different. For example, the first axle may have two wheels and the second axle may have three wheels.

The first and second axles may be mounted directly on the outrigger of a material handling vehicle. For example, the outrigger may contain a recess at the distal end, that is, the end opposite the point of attachment to the body of the vehicle, and the first and second axles and wheels may be mounted on the outrigger in tandem. Alternatively, the first and second axles and wheels may be arranged in tandem, as part of a module that is mounted on the distal end of the outrigger.

Generally, material handling vehicles used in combination with the present invention will have two outriggers, for example, one on each side of the forks or platform at the front of the vehicle (a single outrigger or additional outriggers may be used, however). Accordingly, the wheel assembly of the present invention may be mounted at the end of each of the outriggers.

In another embodiment of the invention, the first and second axles and wheels are supported by brackets positioned at the ends of the axles, with the brackets aligned parallel to each other and perpendicular to the longitudinal extent of the axles. The wheel assembly, which in this embodiment includes the brackets, axles, and wheels, can then be pivotally mounted on the outrigger. The pivot point of the bracket assembly is between the first and second axles, but the pivot point, first axle, and second axle are not necessarily collinear or coplanar, and the pivot point may be offset to a position above the first and second axles with respect to the ground. By way of example, with the pivot point as the vertex, imaginary rays extending from the vertex to the first and second axles may form an angle from 20° to 180°, preferably greater than 30° and less than 180°. in particular, from 35° to 170°, and more particularly, from 40° to 150°.

The wheel assembly can be pivotally mounted to the outrigger in a variety of ways. For example, a shaft may extend from the first bracket to the second bracket, parallel to the first and second axles, and the shaft may engage the outrigger. Alternatively, the first and second brackets may be provided with outwardly facing projections, and the projections may engage the outrigger. Alternatively, the outrigger may be provided with inwardly facing projections, and the projects may engage the first and/or second bracket. Alternatively, the outrigger and the first and/or second brackets may have a recess configured to accommodate mounting hardware such as a shaft, bolt, or the like.

The inventors of the present application have determined that the relationship between the distance from the first axle to the second axle and the aggregate width of the wheels on an axle exerts a strong influence on the performance of the wheel assembly. In the case of two wheels mounted on an axle, the aggregate width of the wheels is measured from the outwardly facing side of the first wheel to the outwardly facing side of the second wheel. In the case of three or more wheels mounted on the axle, the aggregate width is measured from the outwardly facing side of the first wheel to the outwardly facing side of the wheel farthest from the first wheel. The distance between the axles is measured from the center line of the first axle to the center line of the second axle. If the distance between the axles is X, and the aggregate width of the wheels on an axle is Y, then the ratio of X:Y may be between 0.5 and 1.3, in particular, between 0.5 and 1.2, more particularly, between 0.6 and 1.1. If the aggregate width of the wheels on the first axle and the second axle is different, then X is the higher of the aggregate widths.

The inventors of the present application have also determined that the relationship between the distance from the first axle to the pivot point of the wheel assembly and the distance from the second axle to the pivot point of the wheel assembly also exerts an influence on the performance of the wheel assembly. In particular, where the distance between the first axle and the pivot point is D, and the distance between the second axle and the pivot point is E, then the ratio of D:E should be between 1:4 to 4:1, and, in particular, from 1:2.3 to 2.3:1, and more particularly, from 1:1.5 to 1.5:1.

The inventors of the present application have also determined the distance from the first axle to the second axle should be less than two times the mean wheel diameter for the wheels used on the first and second axles. More preferably, the distance should be less than 1.9, 1.8, 1.7, 1.6, 1.5, 1.4, 1.3, 1.2, or 1.1 times the mean wheel diameter. Most preferably, the distance from the first axle to the second axle should be 1.1 or 1.05 times the mean wheel diameter, i.e., locating the wheels as close as possible while leaving sufficient room for debris to pass between the wheels without causing damage or becoming lodged in the wheel assembly.

The wheel assemblies and outriggers described herein may incorporate materials commonly used in wheel assemblies and outriggers. For example, the wheels include a tire made of a solid elastomer, such as a polyurethane, a rim made of a metal alloy, and a bearing. The brackets, brace, outriggers, and associated mounting projections and/or shafts are made of a metal alloy.

To be compatible with typical material handling vehicles and modern warehouse configurations, the wheel assembly of the present application preferably has a total width of less than seven inches and a total height of less than six inches (North America) or eight inches (Europe). The present invention has a number of advantages. Two axles and sets of wheels are provided to distribute the load. Yet instead of increasing the resistance to pivoting a material handling vehicle incorporating the wheel assembly, the wheels along each axle are able to rotate independently, thereby decreasing the resistance. Furthermore, in the embodiment in which the wheel assembly is pivotally mounted on an outrigger, the wheel assembly is generally able to keep both wheels in contact with the floor, even if the floor is uneven, thereby distributing the load.

Further objects, features, and advantages of the present application will become apparent from the detailed description of preferred embodiments, which is set forth below, when considered together with the figures of drawing.

DETAILED DESCRIPTION OF THE INVENTION

Figure 1:
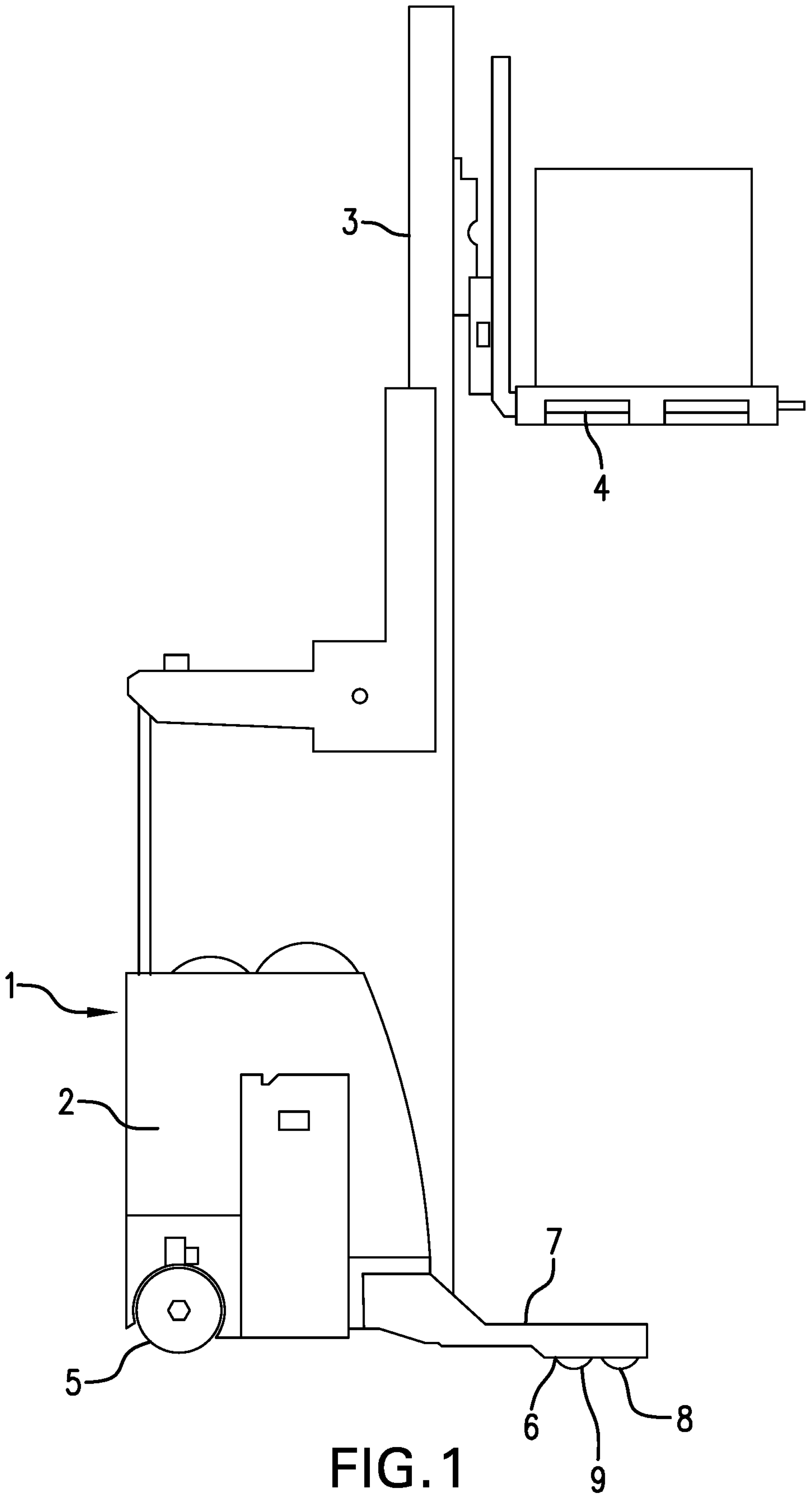
FIG. 1 is a side view of a material handling vehicle of the type for use with the wheel assembly of the present invention.

Without intending to limit the scope of the invention, the preferred embodiments and features are hereinafter set forth. All the United States patents and published patent applications cited in the specification are incorporated herein by reference. As used herein, the term "wheel" is intended to encompass a tire, which may be a solid elastomer, such as a polyurethane, a rim on which the tire is mounted, and a set of bearing within the rim.

As referred to herein, the term "powered industrial truck" means a mobile, power-propelled truck used to carry, push, pull, lift, stack, or tier material. Vehicles that are used for earth moving and over-the-road hauling are excluded. Under OSHA regulations, there are seven classes of powered industrial trucks:

- Class I: Electric Motor, Sit-down Rider, Counter-Balanced Trucks (Solid and Pneumatic Tires). Powered industrial trucks in this class are electrically powered and are typically used indoors on flat, even surfaces. They have cushion or pneumatic tires.
- Class II: Electric Motor Narrow Aisle Trucks (Solid Tires). Powered industrial trucks in this class are electrically powered and designed for tight warehouse aisles. They are high-lift machines, often used in distribution centers and warehouses. They are designed to operate in narrow aisle stacking areas where Class I and Class III trucks cannot operate.
- Class III: Electric Motor Hand Trucks or Hand/Rider Trucks (Solid Tires). Powered industrial trucks in this class are hand-controlled (either walk-behind or operated on a small platform) and used for low-lift applications, e.g., pallet jacks.
- Class IV: Internal Combustion Engine Trucks (Solid Tires). Powered industrial trucks in this class include an internal combustion engine and are suited for indoor use on smooth floors. They are typically used for moving materials onto and off of trucks and for warehousing.
- Class V: Internal Combustion Engine Trucks (Pneumatic Tires). Powered industrial trucks in this class have an internal combustion engine and are designed for rough surfaces outdoors. They are commonly used in loading docks and lumber yards.
- Class VI: Electric and Internal Combustion Engine Tractors (Solid and Pneumatic Tires). Powered industrial trucks in this class are usually sit-down rider tow tractors used for pulling loads (rather than lifting). They can be used in both indoor and outdoor environments.
- Class VII: Rough Terrain Forklift Trucks (Pneumatic Tires). Powered industrial trucks in this class are typically used in construction, logging, and other rough terrain applications. They have large, tractor-style tires for navigating over difficult terrain, and are frequently used for lifting and transporting heavy loads.

FIGS. 6-12 of this application depict examples of Class I to Class VII powered industrial trucks according to the United States Department of Labor Occupational Safety and Health Administration (OSHA).

As indicated herein, the present application relates primarily to Class II powered industrial trucks, i.e., narrow aisle forklifts or trucks, including reach trucks, orders pickers, and very narrow aisle forklifts, also referred to as turret trucks, and, more specifically, to wheel assemblies and outriggers used therein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

FIG. 1 shows Class II material handling vehicle 1, namely, a reach truck. Vehicle 1 has body 2 supporting mast 3, for raising and lowering forks 4. Drive wheel 5 is positioned at the rear of body 2, along with a caster wheel (not shown). Vehicle 1 is provided with outriggers 6 and 7, which extend from the front of body 2, on either side of forks 4.

Each of outriggers 6 and 7 has first axle 8, with a plurality of wheels mounted thereon, and second axle 9, with a plurality of wheels mounted thereon. First axle 8 and second axle 9 are arranged in tandem, with the axles aligned perpendicular to the longitudinal extend of the outrigger, which in this case is the ordinary direction of travel of vehicle 1.

Figure 2:
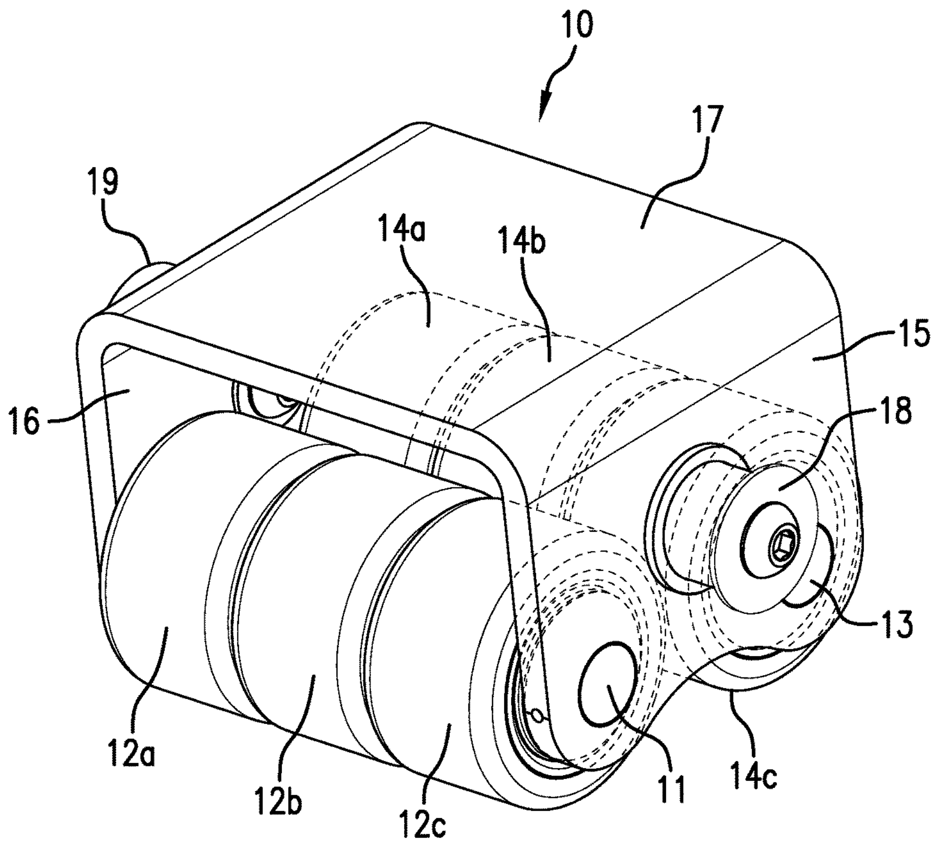
FIG. 2 is an isometric view of the wheel assembly of the present invention having a bracket with projections to engage the leg of a material handling vehicle.

Referring to FIG. 2, wheel assembly 10 has first axle 11, with wheels 12*a*, 12*b* and 12*c* mounted thereon. Wheels 12*a*, 12*b* and 12*c* rotate independently of each other. Wheel assembly 10 is provided with second axle 13, with wheels 14*a*, 14*b* and 14*c* mounted thereon, which also rotate independently of each other. Axles 11 and 13 each have one end supported by bracket 15, and the axles each have an opposite end supported by bracket 16. Brackets 15 and 16 are joined together by brace 17, which spans the wheels 12*a-c* and 14*a-c*, and maintains brackets in the desired orientation, that is, parallel to each other and perpendicular to axles 11 and 13. Bracket 15, bracket 16 and brace 17 may be fashioned from a unitary plate of metal, which has been bent into the desired orientation.

Wheel assembly 10 is provided with mounting hardware, for pivotally engaging an outrigger of a material handling vehicle. In the embodiment illustrated in FIG. 2, bracket 15 is provided with projection 18, and bracket 16 is provided with projection 19. Accordingly, an outrigger of a material handling vehicle can be configured to accommodate projections 18 and 19, in a way that will allow wheel assembly 10 to pivot on an imaginary axis extending between projections 18 and 19. In this way, the wheel assembly forms a complete module, which can be mounted on the outrigger of a material handling vehicle.

Figure 3:
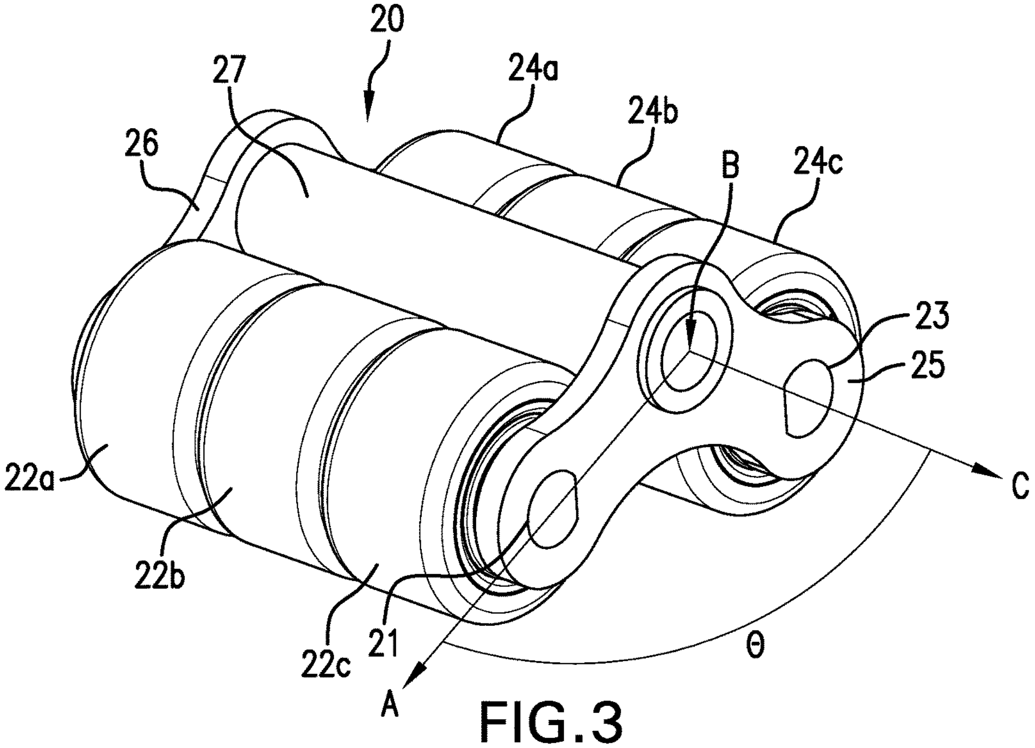
FIG. 3 is an isometric view of the wheel assembly of the present invention having brackets with a shaft to engage the leg of a material handling vehicle.

FIG. 3 shows another embodiment of the wheel assembly of the present invention.

Wheel assembly 20 has first axle 21, with wheels 22*a*, 22*b* and 22*c* mounted thereon. Wheels 22*a*, 22*b* and 22*c* rotate independently of each other. Wheel assembly 20 is provided with second axle 23, with wheels 24*a*, 24*b* and 24*c* mounted thereon, which also rotate independently of each other. Axles 21 and 23 each have one end supported by bracket 25 and the axles each have an opposite end supported by bracket 26. Brackets 25 and 26 are joined together by shaft 27, which maintains the brackets in parallel relationship, perpendicular to the axles. When wheel assembly 20 is mounted on an outrigger, wheel assembly 20 pivots on an axis extending through shaft 27. Thus, wheel assembly 20 forms a complete module, which can be mounted on the outrigger of a material handling vehicle.

It has been found to be advantageous to offset the axis on which the wheel assembly pivots from the first and second axles. In other words, the pivot point, first axle and second axle may not necessarily be in a straight line. For example, if the pivot point of the wheel assembly is taken as the vertex, then a ray extending from the vertex to the first axle forms one arm of an angle and a ray extending from the vertex to the second axle forms a second arm of an angle.

The angle between the pivot point, first axle and second axle may range from 20° to 180°, preferably greater than 30° and less than 180°, in particular, from 35° to 170°, and more particularly, from 40° to 150°. Referring to FIG. 3, the angle is shown as θ, which is formed by arm "A", vertex "B" and arm "C." In an embodiment of the present application, the pivot point is located less than one wheel radius above a line (or plane) connecting the first and second axles, to maintain stability when the wheel, wheel assembly, outrigger, or truck strikes an object. In an alternative embodiment, a negative angle may be provided, i.e., the center pivot may be located below the centerline of one or more of the axles with respect to the ground or floor. Such an arrangement would provide extra stability with respect to circumstances in which the wheels, wheel assembly, outrigger, or truck struck an object. In the alternative embodiment, the wheel 5 assembly would create a level to return the wheel assembly to the desired orientation.

Figure 4:
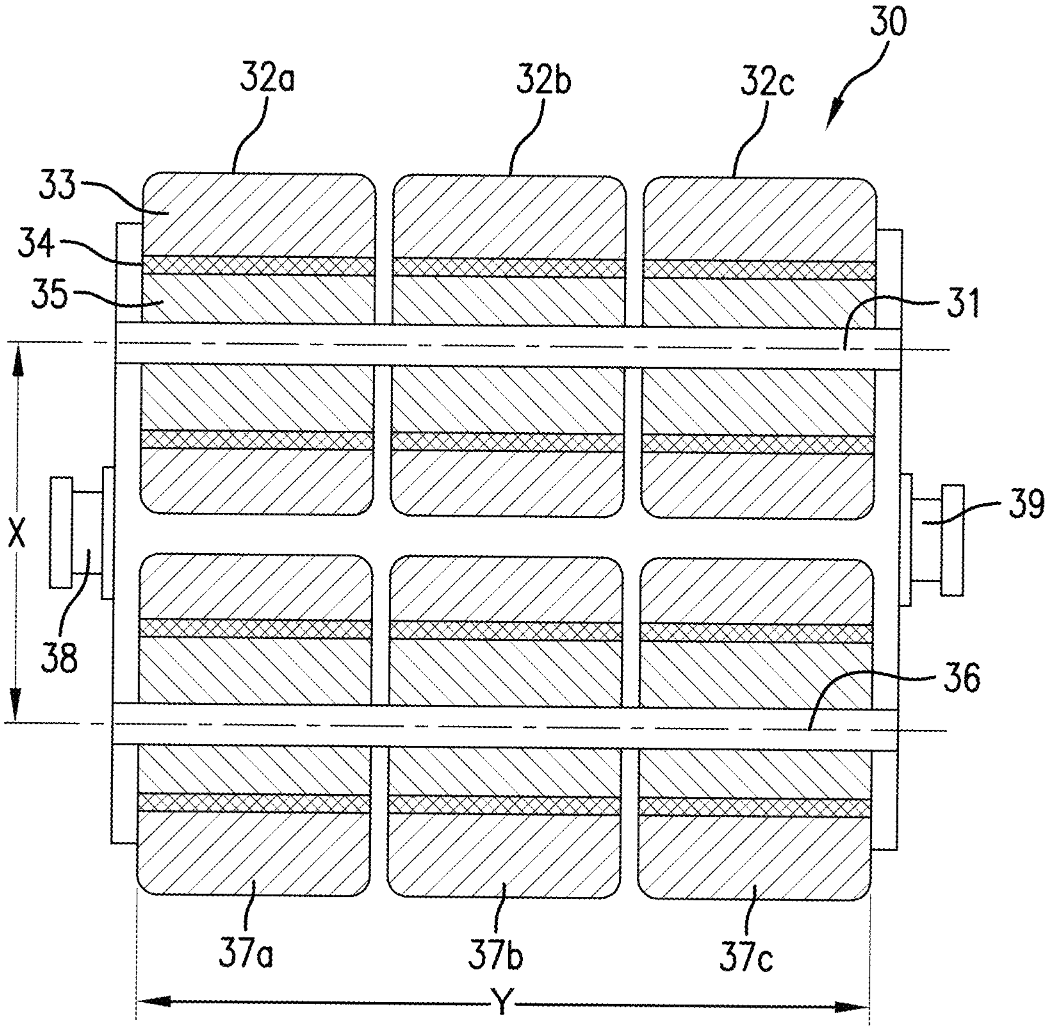
FIG. 4 is a cross-sectional view of a wheel assembly showing the measurement of X (the distance between the first axle and the second axle) and Y (the aggregate width of the wheels).

Referring to FIG. 4, a cross-sectional view of a wheel assembly of the present invention is shown. Wheel assembly 30 has first axle 31, with wheels 32*a*, 32*b* and 32*c* mounted thereon, and which rotate independently of each other. Each of the wheels may be comprised of outer tire 33, mounted on rim 34. Bearings 35 are provided between rim 34 and axle 31, as is known in the art. Wheel assembly 30 is further provided with second axle 36, with wheels 37*a*, 37*b* and 37*c*, which rotate independently of each other. Wheels 37*a-c* may be comprised of the same tire, rim and bearings arrangement, as illustrated with regard to wheel 32*a*. Wheel assembly has projections 38 and 39 for pivotally mounting the wheel assembly on the outrigger of a material handling vehicle, as described with regard to the embodiment of the invention disclosed in FIG. 3.

FIG. 4 illustrates the relationship between the distance from the first axle to the second axle, shown as "X," and the aggregate width of the wheels on an axle, shown as "Y." The ratio of X divided by Y may be between 0.5 and 1.3, in particular, between 0.5 and 1.2, more particularly, between 0.6 and 1.1.

Figure 5:
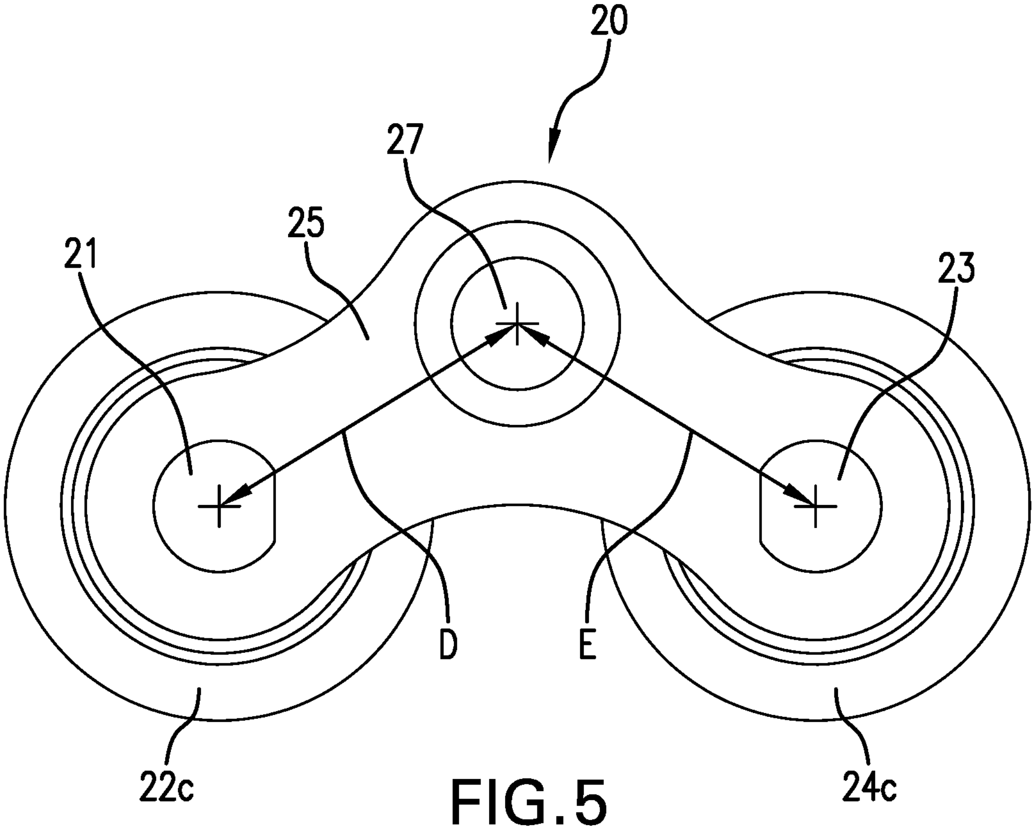
FIG. 5 is a side elevation view of the wheel assembly of FIG. 3, illustrating the relative distances of the first axle and second axle from the pivot point of the assembly.

FIG. 5 is a side view of the wheel assembly of FIG. 3, which is also applicable to the wheel assembly illustrated in FIG. 2. Referring to FIGS. 4 and 5, wheel assembly 20 has first axle 21, wheels 22*a*-22*c*, second axle 23 and wheels 24*a*-24*c*. Axles 21 and 23 are supported by brackets 25 and 26. Shaft 27 is the pivot point of wheel assembly 20. Segment "D" is the distance between the axis of axle 21 to the axis of shaft 27. Segment "E" is the distance between the axis of axle 23 to the axis of shaft 27. The ratio of segment D to segment E may range from 1:4 to 4:1, in particular, from 1:2.3 to 2.3:1, more particularly, from 1:1.5 to 1.5:1.

Figure 6:
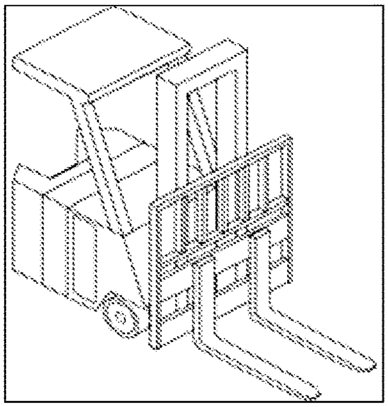
FIGS. 6-12 depict examples of Class I to Class VII powered industrial trucks according to the United States Department of Labor Occupational Safety and Health Administration (OSHA).
Figure 6:
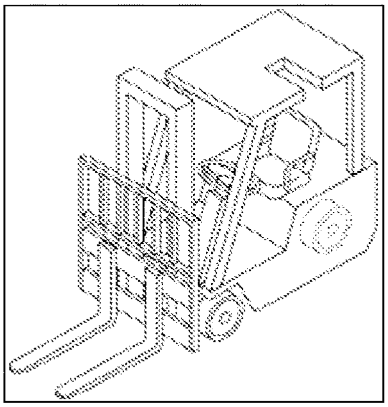
Figure 6:
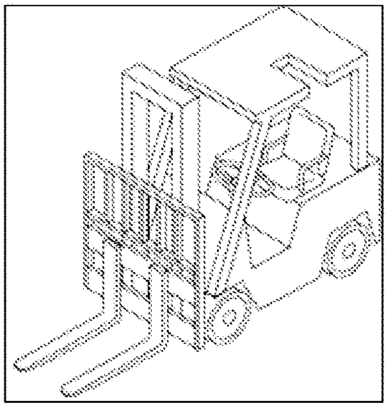
Figure 6:
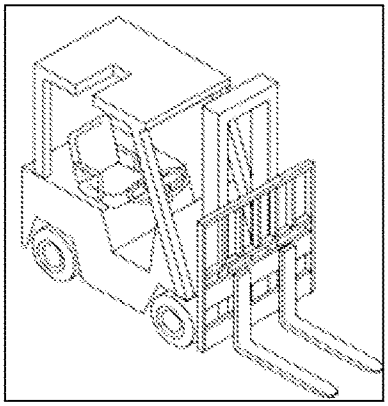

FIG. 6 includes several examples of Class I powered industrial trucks. These examples are enumerated as follows: (A) Code 1: Counterbalanced Rider Type, Stand Up. (B) Code 4: Three Wheel Electric Trucks, Sit Down. (C) Code 5: Counterbalanced Rider, Cushion Tires, Sit Down. (D) Code 6: Counterbalanced Rider, Pneumatic or Either Type Tire, Sit Down.

Figure 7:
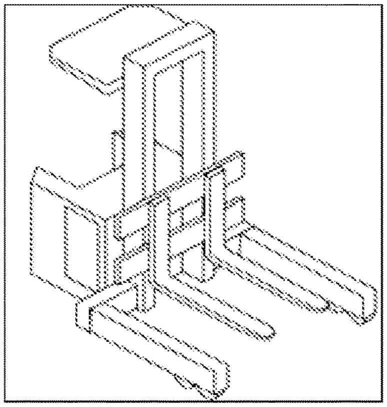
Figure 7:
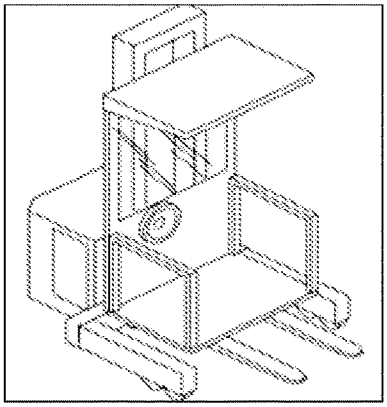
Figure 7:
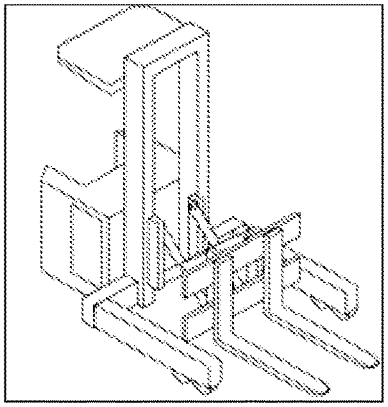
Figure 7:
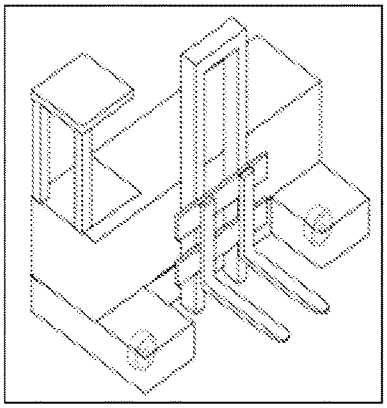
Figure 7:
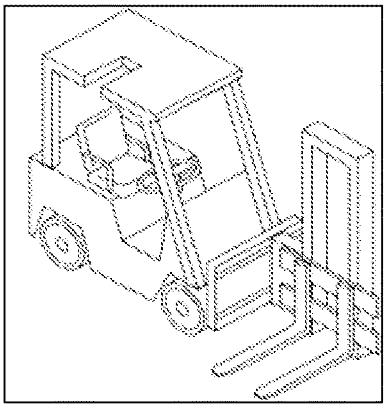
Figure 7:
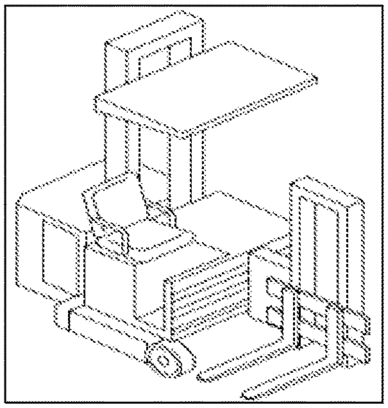
Figure 7:
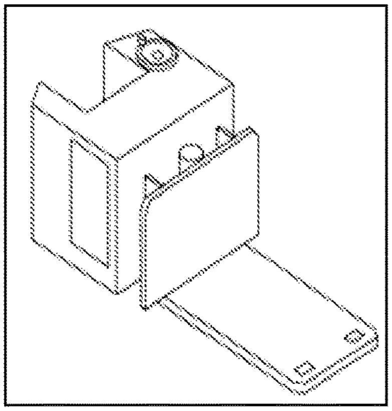
Figure 7:
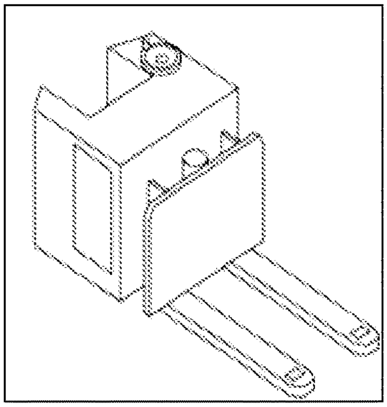

FIG. 7 includes several examples of Class II powered industrial trucks. These examples are enumerated as follows: (A) Code 1: High Lift Straddle. (B) Code 2: Order Picker. (C) Code 3: Reach Type Outrigger. (D) Code 4: Side Loaders: Platforms. (E) Code 4: Side Loaders: High Lift Pallet. (F) Code 4: Turret Trucks. (G) Code 6: Low Lift Platform. (H) Code 6: Low Lift Pallet.

Figure 8:
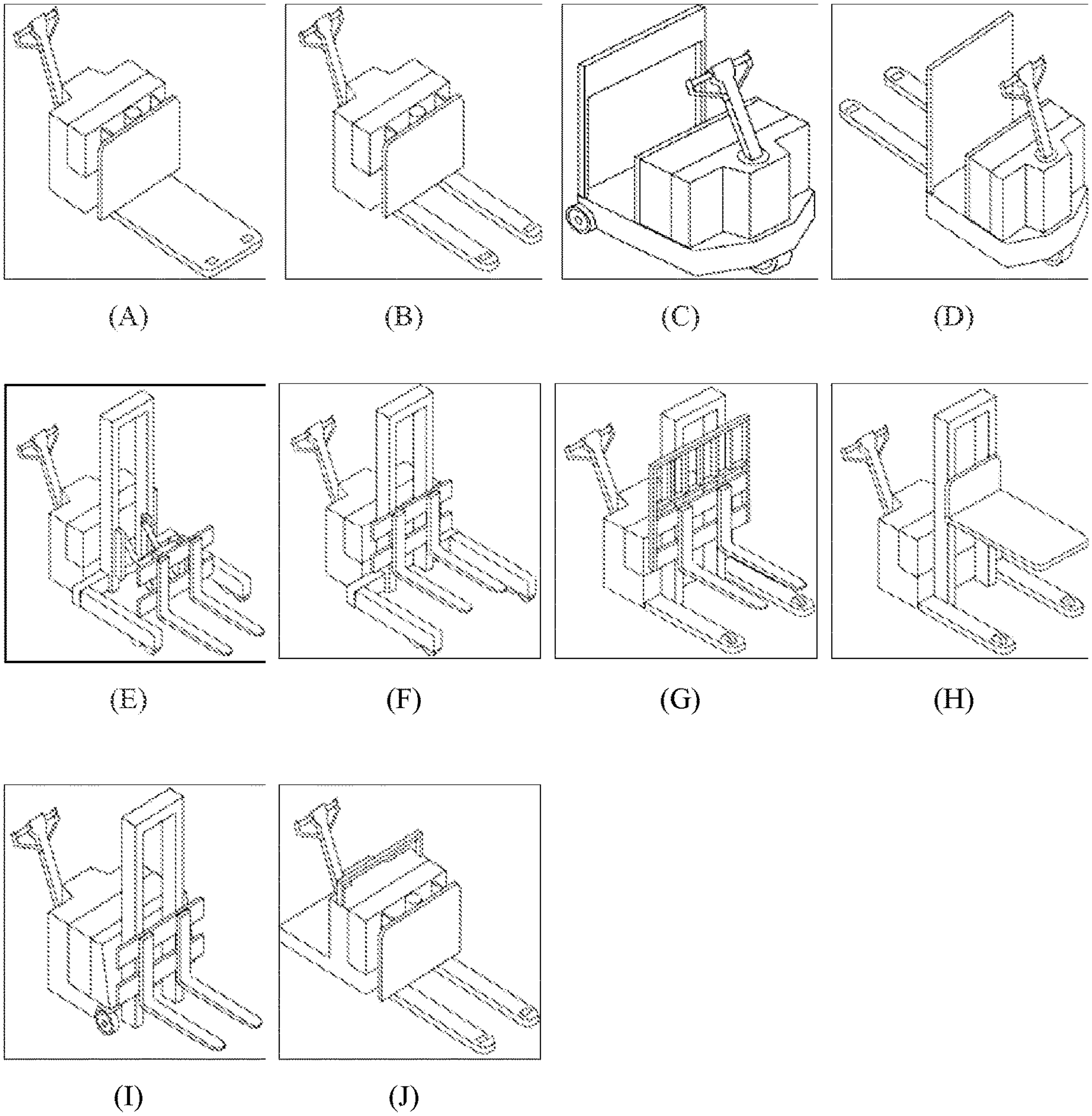

FIG. 8 includes several examples of Class III powered industrial trucks. These examples are enumerated as follows: (A) Code 1: Low Lift Platform. (B) Code 2: Low Lift Walkie Pallet. (C) Code 3: Tractors. (D) Code 4: Low Lift Walkie/Center Control. (E) Code 5: Reach Type Outrigger. (F) Code 6: High Lift Straddle. (G) Code 6: Single Face Pallet. (H) Code 6: High Lift Platform. (I) Code 7: High Lift Counterbalanced. (J) Code 8: Low Lift Walkie/Rider Pallet and End Control.

Figure 9:
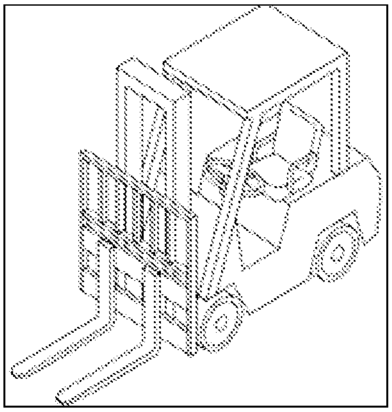

FIG. 9 includes an example of a Class IV powered industrial truck. These example is enumerated as follows: (A) Code 3: Fork, Counterbalanced (Cushion Tire).

Figure 10:
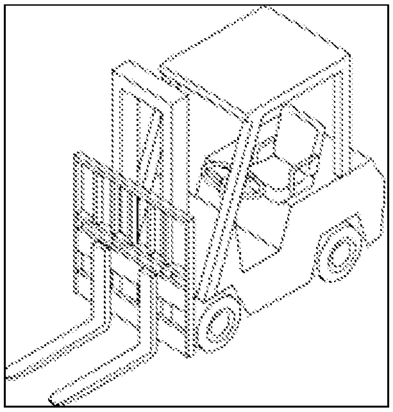

FIG. 10 includes an example of a Class V powered industrial truck. These example is enumerated as follows: (A) Code 4: Fork, Counterbalanced (Pneumatic Tire).

Figure 11:
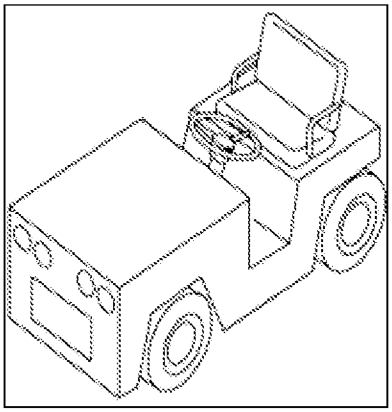

FIG. 11 includes an example of a Class VI powered industrial truck. These example is enumerated as follows: (A) Code 1: Sit-Down Rider (Draw Bar Pull Over 999 lbs.).

Figure 12:
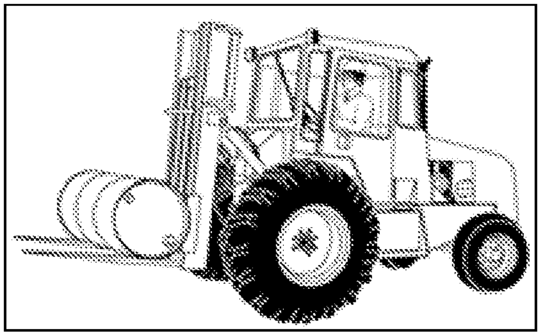
Figure 12:
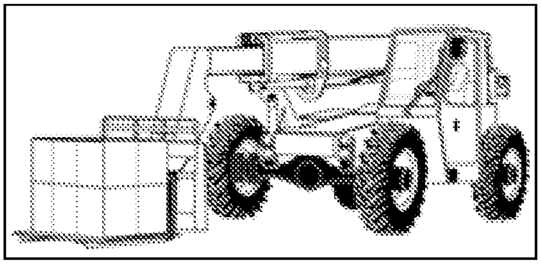
Figure 12:
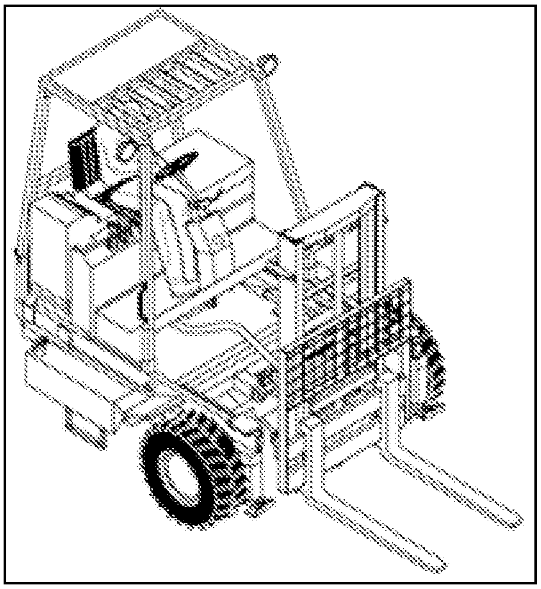

FIG. 12 includes several examples of Class VII powered industrial trucks. These examples are enumerated as follows: (A) Vertical mast type. (B) Variable reach type. (C) Truck/trailer mounted.

The present invention has been described in relation to a material handling vehicle having outriggers or legs, extending from the body of the vehicle, for example, laterally in the direction of the forks or platform that is raised to retrieve pallets and goods stored in a warehouse. A pair of the subject wheel assemblies may also be employed to replace a set of load wheels positioned in the back or front of the body of the vehicle, that is, directly under the body, rather than in an outrigger.

There are, of course, many alternative embodiments and modifications of the invention intended to be included in the scope of the claims.

Further Embodiments

A-1. A wheel assembly for an outrigger of a material handling vehicle, comprising:
- a first axle, a first wheel mounted on the first axle and a second wheel mounted on the first axle, whereby the first wheel and the second wheel rotate independently;
- a second axle, a first wheel mounted on the second axle and a second wheel mounted on the second axle, whereby the first wheel and the second wheel rotate independently;
- wherein the first axle and the second axle are mounted on the outrigger, in tandem.

A-2. The wheel assembly of A-1, wherein a distance between the first axle and the second axle has a value of X, and a distance between an outside of the first wheel and an outside of the second wheel on the first axle has a value of Y, and X/Y is between 0.5 and 1.3.

A-3. The wheel assembly of A-1 to A-2, wherein the first axle has a first end and a second end and the second axle has a first end and a second end, and the wheel assembly further comprises (i) a first bracket engaging the first end of the first axle and the first end of the second axle, and (ii) a second bracket engaging the second end of the first axle and the second end of the second axle, whereby the first bracket and the second bracket are parallel to each other and perpendicular to the first axle and second axle, and whereby the first and second brackets can be pivotally mounted on the outrigger.

A-4. The wheel assembly of A-1 to A-3, further comprising a shaft having a first end engaging the first bracket and a second end engaging the second bracket, and the wheel assembly can be mounted on the outrigger, whereby the wheel assembly pivots around the shaft.

A-5. The wheel assembly of A-1 to A-4, wherein the first bracket has a first outwardly facing projection and the second bracket has a second outwardly facing projection and the first projection and the second projection can engage the outrigger, whereby the wheel assembly pivots around the first and second projections.

A-6. The wheel assembly of A-1 to A-5, whereby the wheel assembly pivots at a point, and the first axle and the second axle are at an angle of 30° to 180° relative to the pivot point.

A-7. The wheel assembly of A-1 to A-6, further comprising a third wheel mounted on the first axle, and the third wheel rotates independently of the first and second wheels of the first axle.

A-8. The wheel assembly of A-1 to A-7, further comprising a third wheel mounted on the second axle, and the third wheel rotates independently of the first and second wheels on the second axle.

A-9. The wheel assembly of A-1 to A-8, wherein a distance between the first axle and the second axle has a value of X, and a distance between an outside of the first wheel and an outside of the third wheel on the first axle has a value of Y, and X/Y is between 0.5 and 1.3.

A-10. The wheel assembly of A-1 to A-9, wherein the first axle has a first end and a second end and the second axle has a first end and a second end, and the wheel assembly further comprises (i) a first bracket engaging the first end of the first axle and the first end of the second axle, and (ii) a second bracket engaging the second end of the first axle and the second end of the second axle, whereby the first bracket and the second bracket are parallel to each other and perpendicular to the first axle and second axle, and whereby the first and second brackets can be pivotally mounted on the outrigger.

The foregoing description of preferred embodiments has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

We claim:

1. A wheel assembly for an outrigger of a material handling vehicle, comprising:
- a first axle, a first wheel mounted on the first axle and a second wheel mounted on the first axle, whereby the first wheel and the second wheel rotate independently;
- a second axle, a first wheel mounted on the second axle and a second wheel mounted on the second axle, whereby the first wheel and the second wheel rotate independently;
- wherein the first axle and the second axle are mounted on a first and second bracket of the wheel assembly, in tandem, and the first and the second bracket are pivotally mounted to the outrigger such that each of the first and the second bracket each have a pivot point with respect to the outrigger,
- wherein a distance between the first axle and the second axle has a value of X, and a distance between an outside of the first wheel and an outside of the second wheel on the first axle has a value of Y, and X/Y is between 0.5 and 1.2,
- wherein a distance between the first axle and the pivot point of the first or the second bracket is D, and a distance between the second axle and the pivot point of the first or the second bracket is E, and D: E is between 1:1.5 to 1.5:1,
- wherein a distance from the first axle to the second axle is less than 1.1 times a mean diameter of the first wheel and second wheel of the first and second axles.

2. The wheel assembly of claim 1,
wherein the first axle has a first end and a second end and the second axle has a first end and a second end, wherein the first bracket of the wheel assembly engages the first end of the first axle and the first end of the second axle, and the second bracket of the wheel assembly engages the second end of the first axle and the second end of the second axle, whereby the first bracket and the second bracket are parallel to each other and perpendicular to the first axle and second axle.

3. The wheel assembly of claim 2,
further comprising a shaft having a first end engaging the first bracket and a second end engaging the second bracket, wherein the wheel assembly pivots around the shaft.

4. The wheel assembly of claim 2,
wherein the first bracket has a first outwardly facing projection and the second bracket has a second outwardly facing projection and the first projection and the second projection engage the outrigger, wherein the wheel assembly pivots around the first and second projections.

5. The wheel assembly of claim 2,
wherein the first axle and the second axle are at an angle of 30° to 180° relative to the pivot point of the first or second bracket.

6. The wheel assembly of claim 1,
further comprising a third wheel mounted on the first axle, and the third wheel rotates independently of the first and second wheels of the first axle.

7. The wheel assembly of claim 6,
further comprising a third wheel mounted on the second axle, and the third wheel rotates independently of the first and second wheels on the second axle.

8. The wheel assembly of claim 1, wherein each wheel of the first and second axles comprises a polyurethane rim mounted on a bearing.

9. The wheel assembly of claim 1, wherein the material handling vehicle is a Class II powered industrial truck.

10. The wheel assembly of claim 1, wherein the wheel assembly has a total width of less than 7 inches.

11. The wheel assembly of claim 1, wherein the wheel assembly has a total height of less than 6 inches.

12. The wheel assembly of claim 1, wherein the first bracket and second bracket are fashioned from a unitary plate of metal bent into desired orientation.

13. The wheel assembly of claim 9, wherein the Class II powered industrial truck has a turning radius of less than 1 inch.

* * * * *